A. L. WASHBURN,

Assignor of one-half to N. S. PERKINS.

THREAD DOUBLING MACHINE.

No. 10,364. Reissued Aug. 7, 1883.

Witnesses.
John Edwards Jr.
Geo. F. Curtiss

Inventor.
A. L. Washburn.
By James Shepard.
Atty.

N. PETERS. Photo-Lithographer. Washington. D. C.

UNITED STATES PATENT OFFICE.

ALBERT L. WASHBURN, OF MERIDEN, ASSIGNOR OF ONE-HALF TO NATHANIEL S. PERKINS, OF NEW LONDON, CONNECTICUT.

THREAD-DOUBLING MACHINE.

SPECIFICATION forming part of Reissued Letters Patent No. 10,364, dated August 7, 1883.

Original No. 271,383, dated January 30, 1883. Application for reissue filed March 16, 1883.

*To all whom it may concern:*

Be it known that I, ALBERT L. WASHBURN, formerly of Hartford, now of Meriden, in the county of New Haven and State of Connecticut have invented a new and useful Improvement in Thread-Doubling Machines; and I do hereby declare that the following is a full, clear, and exact description of the same.

My invention relates to machines for doubling thread, and has for its object to produce a thread of evenly-laid strands, so that the same may be smoother and not liable to kink; and I accomplish this end by means of a simple device for regulating and equalizing the tension of the different strands while doubling the thread, as shown in the accompanying drawings, in which—

Figure 1:
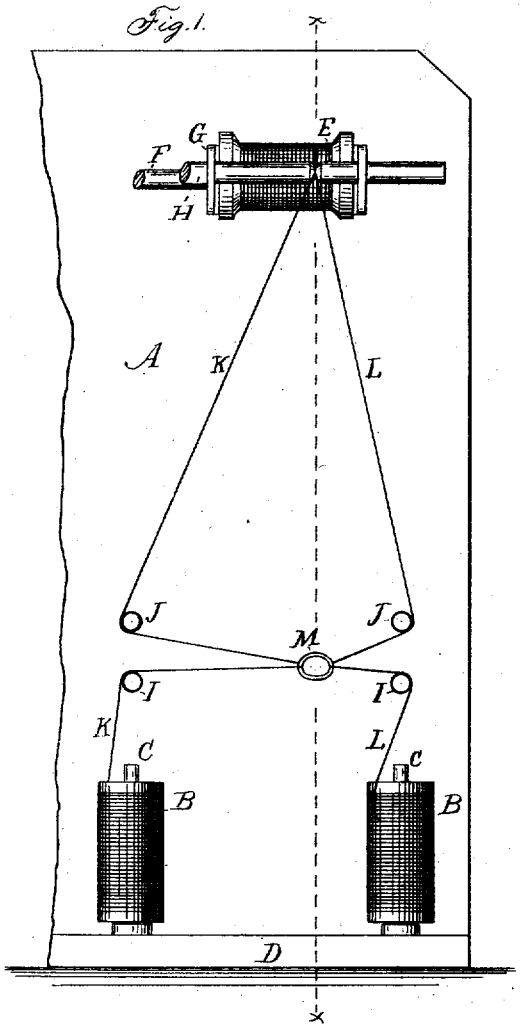
Figure 2:
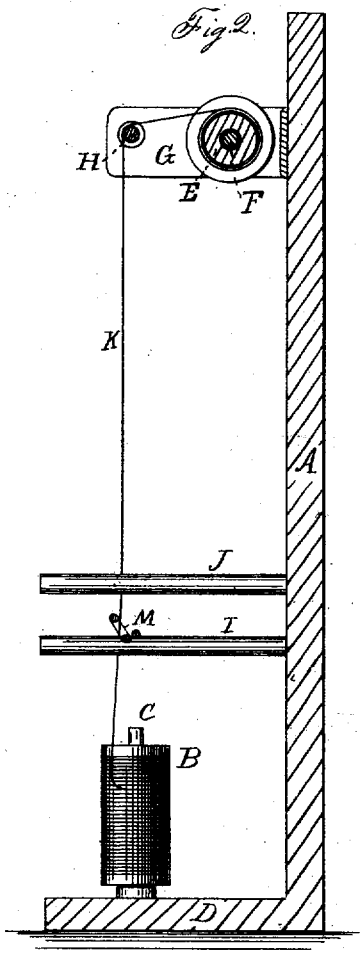
Figure 3:
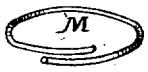

Figure 1 is a front elevation of the principal parts of one form of my thread-doubling machine, showing, also, some contiguous parts. Fig. 2 is a sectional view, partly in elevation, of the same on line *x x* of Fig. 1; and Fig. 3 is a perspective view of the link or floating guide employed in my said thread-doubling machine.

A designates the body of my machine; D, the bar or shelf of the frame, bearing spindles C, which support the delivery-bobbins B upon which the thread is wound, and from which the strands K and L are drawn and wound up together by the receiving-bobbin E. Said bobbin is mounted on the spindle or arbor F, which is caused to rotate in its bearings by suitable machinery.

H designates a transverse bar provided with a groove to receive and unite the strands and to guide them to be wound upon the bobbin E as one thread.

As my invention is applicable to any one of the many forms of thread-doubling machines in use, only so much of the contiguous parts of a machine will be referred to as is necessary to explain its operation. Even the bobbin E or any other winding device is not necessary, for a person might take hold of the strands K L at the groove in rod H and draw them hand over hand from the delivery-bobbins through the floating guide M and accomplish the purpose.

The delivery-bobbins B and their spindles C, as shown in the drawings, are set vertically, and the strands are drawn upward, so that they pass off the ends of said bobbins. In order to properly direct the strands to the floating guide M when thus taken from the delivery-bobbins, I employ guides I I, and I arrange other guides, J J, over or around which the strands pass at a point between the floating guide and the meeting-point of the strands—that is, the point where the strands are brought together for winding. The floating guide is in the form of a link or ring left open at one point, as shown in Fig. 3, so that a strand or strands may be slipped into it sidewise, instead of endwise. Its particular office when threaded is to guide two or more strands in the manner hereinafter explained. I call it a "floating guide," because in the operation of the machine it is suspended by the threads or strands, and is free to move either to the right or left, according to the varying tension of the strands. The several guides I I, M, and J J, are relatively arranged so that each strand is directed to and from the floating guide at an angle in the form of a letter V, as shown. When my machine is thus supplied with strands, it operates upon the principle of the parallelogram of forces. When but two strands are being drawn through it with equal tension, the floating guide will take a position about midway of the guides upon its right and left, and both V's will be of substantially the same length; but when one strand draws harder than the other the guide M will float toward that side where the greatest tension is given to the strand, and thereby take up all the slack in the other strand. Whenever this occurs the slack strand is drawn off from the delivery-bobbin faster than the other strand until their tension is equal, after which both strands are drawn off at the same speed until, for any reason, the tension again becomes unequal. By this means the strands approach the floating guide at varying degrees of tension and at varying speed, and leave said guide with an equal tension, both traveling at the same speed, being wound at the same time upon the same bobbin.

By means of my thread-doubling machine two strands of different sizes—as one strand made up of two smaller strands and the other strand of a smaller one—may be doubled to an even thread of equal tension in both strands.

If desired, more than two strands may be united at once by providing means for supporting the additional delivery bobbin or bobbins and directing the strands to the floating guide, and also providing as many additional guides between the floating guide and the meeting-point of the strands as there are additional strands, the delivery-bobbins standing at equal distances apart, and the floating guide will be at a mean point between the other guides at a distance from each in inverse ratio to the tension of the respective strands. Any usual winding device, E H, may be used—such, for instance, as that shown in Patent No. 50,575—also, any usual device for supporting the bobbins which carry the strands to be doubled.

I am aware that a prior patent shows a thread-winding device having a friction-bar near the delivery-bobbins, around which the strands are wound. The strands are then crossed by passing one over the other at a point between two knife-blades, and from thence they are spread apart by two fixed guides, after which they meet at or near the winding device. The strands extends in a direction which forms two V's upon the right and left, respectively, of the middle point between the knife-blades.

Instead of being left free to move from side to side between the blades, special means are provided to prevent such movement, except in case of breaking one strand; then the other strand will move sidewise and be cut by one of the knives. Such a thread-doubling machine is hereby disclaimed.

I claim as my invention—

The combination of two or more guides, J, and the floating guide, with means for properly supporting two or more delivery-bobbins and directing the thread carried by said bobbins to the floating guide, said guides J being located between the meeting-point of the strands and the floating guides, substantially as described, and for the purpose specified.

ALBERT L. WASHBURN.

Witnesses:

S. ALICE WASHBURN,

GEORGE A. WASHBURN.